United States Patent
Pavlicic

(10) Patent No.: US 8,086,859 B2
(45) Date of Patent: Dec. 27, 2011

(54) GENERATION OF ELECTRONIC SIGNATURES

(75) Inventor: Miladin Pavlicic, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 936 days.

(21) Appl. No.: 11/366,070

(22) Filed: Mar. 2, 2006

(65) Prior Publication Data

US 2007/0208944 A1    Sep. 6, 2007

(51) Int. Cl.
H04L 9/32    (2006.01)
(52) U.S. Cl. ......... 713/176; 713/177; 713/178; 713/180
(58) Field of Classification Search .......... 713/176–178, 713/180
See application file for complete search history.

(56) References Cited

U.S. PATENT DOCUMENTS

| | | | | |
|---|---|---|---|---|
| 5,136,647 | A * | 8/1992 | Haber et al. | 713/178 |
| 5,479,509 | A * | 12/1995 | Ugon | 713/176 |
| 6,345,256 | B1 * | 2/2002 | Milsted et al. | 705/1 |
| 6,766,453 | B1 * | 7/2004 | Nessett et al. | 713/171 |
| 7,139,891 | B1 * | 11/2006 | Apvrille et al. | 711/163 |
| 7,350,076 | B1 * | 3/2008 | Young et al. | 713/169 |
| 2002/0042879 | A1 * | 4/2002 | Gould et al. | 713/176 |
| 2002/0169964 | A1 * | 11/2002 | Klook | 713/178 |
| 2005/0144457 | A1 | 6/2005 | Seung et al. | |

FOREIGN PATENT DOCUMENTS

KR    10-2001-0047752 A    6/2001
WO    03-056745 A1    7/2003

OTHER PUBLICATIONS

International Search Report dated Aug. 6, 2007 for Application No. PCT/US2007/003899, 8 pages.
Cruellas et al., XML Advanced Electronic Signatures (XAdES), World Wide Web Consortium, Note NOTE-XAdES-20030220, Feb. 2003.
Office Action from The Patent Office of the State Intellectual Property Office of the People's Republic of China regarding Application No. 200780007298.7, Jan. 8, 2010.
ETSI TS 101 903 V1.2.2 Technical Specification, "XML Advanced Electronic Signatures (XAdES)", ETSI, Apr. 2004.
Adams et al., "Internet X.509 Public Key Infrastructure Time-Stamp Protocol (TSP)", The Internet Society, Network Working Group Request for Comments (RFC) 3161, Aug. 2001.

* cited by examiner

*Primary Examiner* — Thanhnga Truong
*Assistant Examiner* — Narciso Victoria

(57) ABSTRACT

A generator uses a robust programming framework to create an electronic signature in association with a data item, wherein the electronic signature includes time stamps and/or countersignatures. The generator can create a signature object that computes a signature value of the electronic signature based on the data item. The generator also creates a signature timestamp object to obtain a timestamp of the signature value, wherein the timestamp is associated with the electronic signature. The generator can also invoke a countersignature service on the signature object to obtain a countersignature based on the signature value of the signature object, wherein the countersignature is associated with the electronic signature.

20 Claims, 5 Drawing Sheets

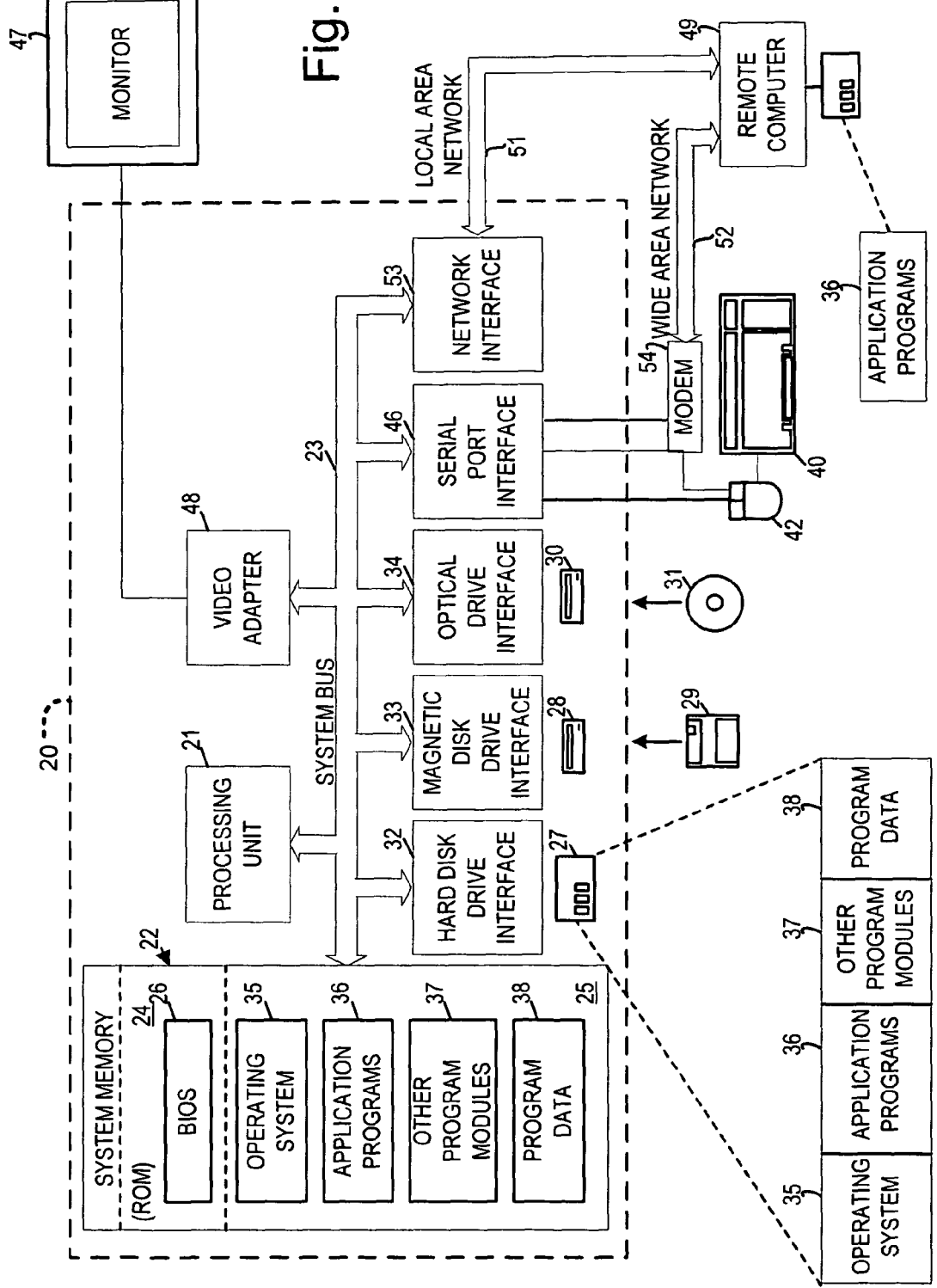

GENERATION OF ELECTRONIC SIGNATURES

BACKGROUND

Electronic commerce is an emerging method of transacting business between parties across local, wide area, and global networks. However, in order for electronic commerce to be considered a safe and reliable means of doing business, there must be suitable controls in place to protect the transaction and to ensure the trust and confidence of both parties in the transaction. For example, it is important that one party can rely on the acceptance of an offer by another party in an electronically conducted transaction within a regime providing effective legal protections.

In this respect, electronic signatures have been offered as an effective security component in protecting the information of a transaction and providing trust in electronic commerce. A European Directive defines an electronic signature as "data in electronic form which is attached to or logically associated with other electronic data and which serves as a method of authentication", although other definitions or variations of this definition are also employed. Generally, an electronic signature can provide evidence that a commitment has been explicitly endorsed under a signature policy, at a given time, by an identified signer, and optionally, a role. The signature policy specifies the technical and procedural requirements on signature creation and verification in order to meet a particular business need.

A given legal framework may recognize a particular signature policy as meeting its statutory, regulatory, and judicial requirements. For example, a specific signature policy may be recognized by courts of law as meeting the legal requirements for electronic commerce. Accordingly, within this legal framework, a holder of an electronic contract can provide evidence that a contract was electronically signed by another party and is therefore enforceable against that party.

Generation of basic electronic signatures generally involved certain cryptographic operations. However, generation of electronic signatures becomes a more complex problem when one adds advanced features, such as qualifying properties, timestamps, and countersignatures. While these features can contribute to long term signature validity and non-repudiation of an original electronic signature, they can also complicate the electronic signature generation process. Existing approaches fail to provide a robust framework for generating such advanced electronic signatures, particularly in the presence of multiple timestamps and countersignatures.

SUMMARY

Implementations described and claimed herein address the foregoing problems by providing a generator that uses a robust programming framework to create an electronic signature in association with a data item, wherein the electronic signature includes time stamps and/or countersignatures. The generator can create a signature object that computes a signature value of the electronic signature based on the data item. The generator also creates a signature timestamp object to obtain a timestamp of the signature value, wherein the timestamp is associated with the electronic signature. The generator can also invoke a countersignature service on the signature object to obtain a countersignature based on the signature value of the signature object, wherein the countersignature is associated with the electronic signature.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

FIG. 5 illustrates an example system that may be useful in implementing the described technology.

DETAILED DESCRIPTIONS

Figure 1:
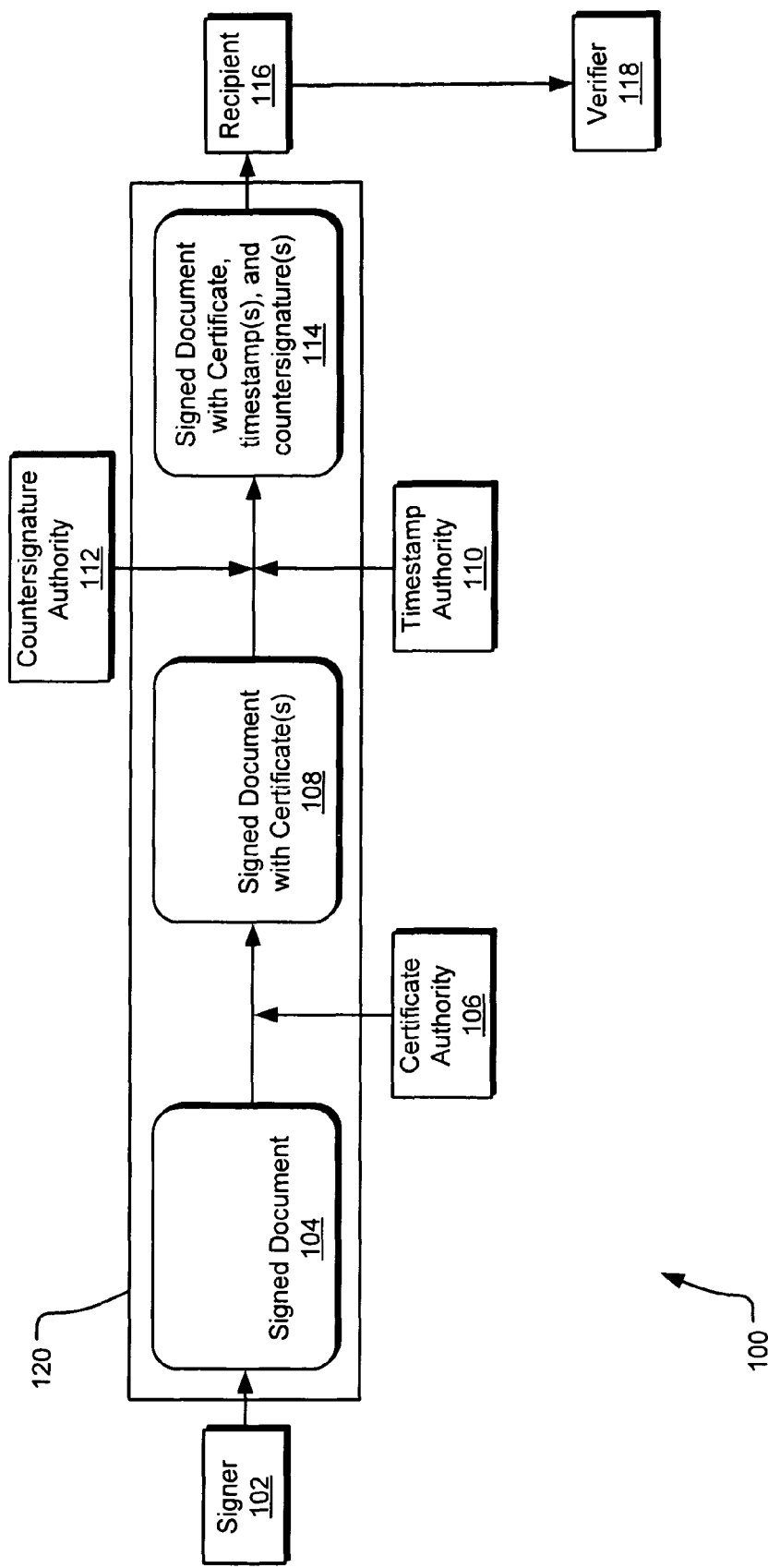
FIG. 1 illustrates an example process for generating and verifying electronically signed data.

FIG. 1 illustrates an example process 100 for generating and verifying electronically signed data. Using an electronic signature generator 120, a signer 102 associates an electronic signature with an electronic document. An electronic signature can be used with any kind of data (e.g., a document, a message, a file, etc.), whether encrypted or not, to authenticate the identity of the signer of the data and to ensure that the original content of the data is unchanged from the time of signing.

From the signer's perspective, creation of an advanced signature generally involves interaction with a user interface of the generator 120. For example, the signer 102 can select a "Sign document" menu option in his or her word processing or email program, which executes the generator 120 to effect the signing. The signed document can then be transmitted to or stored for access by the recipient 116.

Generally, the generator 120 employs an advanced electronic signature framework to generate the electronic signature in association with the document. A specification of an example advanced electronic signature framework is described in Juan Carlos Cruellas, Gregor Karlinger, Denis Pinkas, John Ross, *XML Advanced Electronic Signatures* (XAdES), World Wide Web Consortium, Note NOTE-XAdES-20030220, February 2003, incorporated by reference herein for all that it describes and teaches.

One implementation of the technology described herein employs a XadesSignature class, which provides an advanced-signature-oriented API (Application Programming Interface) for creation and verification of signatures. The XadesSignature class is based on the MICROSOFT®. NET class System.Security.Cryptography.Xml.SignedXml, which is exposed to callers to enable at least one form of extensibility. It should be understood, however, that other implementations may be employed.

In one implementation, for example, the generator 120 creates an electronic signature by executing a hashing algorithm on the digital data that defines a document. Example hashing algorithms may include without limitation variations of Secure Hash Algorithm (SHA), Message Digest Algorithm (MDA), and Race Integrity Primitives Evaluation Message Digest (RIPEMD). Execution of the hashing algorithm on the digital data yields a hash result, often referred to as a "hash" or digest. The generator 120 can then use a private key obtained from a public-private key authority to encrypt the signature digest. The encrypted signature digest represents a basic component of an electronic signature (as a signature value) associated with the data. The signature value can be transmitted or stored in an electronic signature in association with the digital data.

Upon receiving the data and the signature value, a recipient 116 can then use a verifier 118 to verify the received digital data. For example, the verifier 118 can use the signer's public key (available from the signer, a public-private key authority, or some other source) to decrypt the encrypted signature digest associated with the document (ostensibly yielding the original signature digest). The verifier 118 can also generate a hash of the received digital data. If the hash of the received digital data and the decrypted signature digest match, validity of the basic electronic signature, and therefore the received digital data, is considered verified, at least at a basic level. That is, absent other security problems, the signature is considered to be that of the signer and the document is unchanged from the time of signing.

Accordingly, by associating the document with an electronic signature, the signer 102 (through the generator 120) creates a signed document 104 that can be verified at some level by a recipient 116 or a verifier 118. It should be noted that the electronic signature can be associated with the document in several different ways, including: embedding the electronic signature in the document, embedding the document in the electronic signature, referencing the document in the electronic signature, referencing the electronic signature in the document, and storing the document and electronic signature in association with each other (e.g., in the same file system directory or folder).

Nevertheless, this basic level of verification still exhibits considerable trust concerns. For example, the verifier 118 is making the assumption that the public key used to decrypt the encrypted signature digest actually belongs to the signer and is still valid. However, the public key may no longer be valid (e.g., the corresponding private key has been stolen, the signer is no longer authorized to use the private key, etc.).

Accordingly, the generator 120 can certify the electronic signature by invoking certification services by one or more trusted parties (such as certificate authorities 106 or some other certification entities, collectively referred to herein as "certificate signers") to attest that the public key belongs to a specified signer. Generally, a certificate uses an electronic signature to bind together a public key with an identity—information such as the name of a person or an organization, the public key owner's address, etc. An example certificate may include the public key being signed, a name or identifier of a person, a computer or an organization, a validity period, and an address (e.g., a URL) of a revocation center, although other forms of certificates may be employed. In a typical public key infrastructure (PKI) scheme, for example, data can be certified by a trusted certificate authority (CA). In a web of trust scheme, a certificate can be signed by the signer (a self-signed certificate) or other users ("endorsements"). In either case, electronic signatures on a certificate are attestations by the certificate signer that the identity information and the public key belong together.

Certificates can be used for the large-scale use of public key cryptography. Securely exchanging secret keys among a multitude of users becomes impractical and unsafe without additional protections. For example, if a first party wants others to be able to send him or her secret messages, the first party can publish a public key associated with the first party. Anyone possessing the public key can then send the party secure information. Unfortunately, a second party can also publish a public key claiming that the public key belongs to the first party and can therefore receive secret messages intended only for the first party. However, if the first party builds his or her public key into a certificate and has it digitally signed by a trusted third party (e.g., a certificate authority), anyone who trusts the trusted third party can merely check the certificate to see whether the trusted third party has certified that the embedded public key belongs to the first party. In this manner, a sender of secret information to the first party can have confidence that only the first party can access the secret message. By analogy, certification can allow a verifier to have confidence that an electronic signature actually belongs to the signer.

Further, in large-scale deployments, chains of certificates may be employed. For example, the first party may not be familiar with a second party's certificate authority, so the second party's certificate may also include his or her certificate authorities public key signed by a "higher level" certificate authority (e.g., a commercial certificate authority), which might be recognized by the first party. This process can lead to a chain of certificates, all of which are certified by an ultimately trusted party, that in combination attest that a public key belongs to a specified individual.

However, certification has its own security concerns. Some certificates have a limited validity period, outside of which the certificate is considered expired. In addition, a certificate may be revoked, for example, if it is discovered that its related private key has been compromised (e.g., the certificate authority's systems have been hacked) or if the relationship between a signer and a specific public key embedded in the certificate is discovered to be incorrect or has changed (e.g., if a person changes jobs or names). One method for determining whether a certificate has been revoked is compare the certificate against a certificate revocation list (CRL)—a list of revoked or cancelled certificates. Another method of determining the validity of a certificate is to query the certificate authority using the Online Certificate Status Protocol (OCSP) to obtain the status of a specific certificate.

Therefore, while certification provides some confidence that the electronic signature associated with a document is that of a specified signer, it is possible that the certificate itself had expired or was revoked (collectively referred to as "invalidated") at the time it was associated with the electronic signature. For example, assume the signer 116 electronically signs the document and has the electronic signature certified with a revoked certificate. Because the certificate was revoked at the time the signature was certified, the verifier 118 cannot sufficiently demonstrate for evidentiary purposes that the signer 116 actually signed the document (e.g., the hacker of the certificate authority could have stolen the certificate, signed the document, and certified his own signature as that of the signer 116).

To provide protection in such circumstances, the generator 120 can create timestamps to enhance the security of advanced electronic signatures. A timestamp is a type of electronic signature that can be obtained from a trusted third-party (e.g., a timestamp authority 110) to attest that the certificate or certificate chain of the electronic signature existed and was valid at the time specified in the timestamp. In one implementation, the timestamp authority 110 verifies the electronic signature and the certificate chain. If these are valid, then the timestamp authority 110 hashes a collection of timestamp data, which includes a time value and the electronic signature digest, and associates the timestamp hash with the electronic signature. In another implementation, the timestamp authority receives a hash of the original signature's signature value and merely signs that hash with a timestamp. The timestamp can also be certified by one or more trusted third parties. In one implementation, the generator 120 creates and issues calls to signature objects and timestamp objects within a programming framework that implements the generation of electronic signatures with one or more timestamps.

Assuming verification of the basic electronic signature, including associated qualifying properties and certificates, is accomplished, one or more timestamps associated with the electronic signature can be verified to determine whether the electronic signature and certificates were valid at the time of signing. If no certificate of the electronic signature was invalid at the time specified in the timestamp, then validity of the electronic signature is said to be verified as of the time specified in the timestamp. If the certificate or certificate chain of the electronic signature was revoked after the time of the timestamp, the trust in the electronic signature is unimpaired because validity has at least been verified at one point in time.

However, certificates associated with timestamps may also expire or be revoked. This situation does not mean that the electronic signature is invalid, just that a timestamp of the electronic signature cannot be trusted. Accordingly, a possessor of an electronically signed document may submit the electronic signature to one or more timestamp authorities over time, thereby associating multiple timestamps with the electronic signature. For example, a company may submit its existing contracts to a timestamp authority on an annual basis to reinforce the validity of the electronically signed document. In this manner, the company obtains multiple attestations that at a given time the electronic signature was valid. If one or more timestamps are found to be revoked, then it is likely that another timestamp remains valid, thereby preserving the validity of the electronic signature, at least at one point in time.

In addition, the generator 120 can associate an electronic signature value in an advanced electronic signature with one or more electronic countersignatures from third parties (e.g., a countersignature authority or some other party, collectively referred to as "countersignature entities"). An electronic countersignature represents approval or notarization of the original signer's electronic signature by another party. An electronic countersignature may also be certified by one or more certificates. For example, execution of a document may require an electronic signature from two or more parties before it is considered legally binding. Accordingly, a countersignature represents an electronic signature of an identified second party and is associated with the same data electronically signed by the identified first party. A countersignature effectively signs an existing signature associated with the data. One or more countersignatures may be associated with a single document. An electronic countersignature may also be associated with its own timestamp(s) and/or countersignature(s). In one implementation, the generator 120 creates and issues calls to signature objects within a programming framework that implements the generation of electronic signatures with one or more countersignatures. In another implementation, a countersignature authority 112 creates and issues calls to countersignature objects with a programming framework that implements computation of countersignatures based on the signatures values associated with signature objects.

A signed document 114 associated with an electronic signature certificate (or chain of certificates), zero or more time stamps, and zero or more countersignatures can then be transmitted to a recipient 116. If the recipient 116 wishes to verify the validity of the electronic signature associated with the signed document 114, the verifier 118 (e.g., a verification module of a document manager, a file manager, an email client, etc.) can receive the signed document 114 and test the electronic signature, timestamps, and/or countersignatures to verify the validity of the electronic signature. In the presence of multiple timestamps and/or multiple countersignatures, an implementation of the verifier 118 can declare the electronic signature as "valid", "valid at a specified point in time", or "invalid" (i.e., not verifiable, which suggests that the electronic signature cannot be trusted). The verifier 118 may also generate other declarations about the verification status on the electronic signature.

Figure 2:
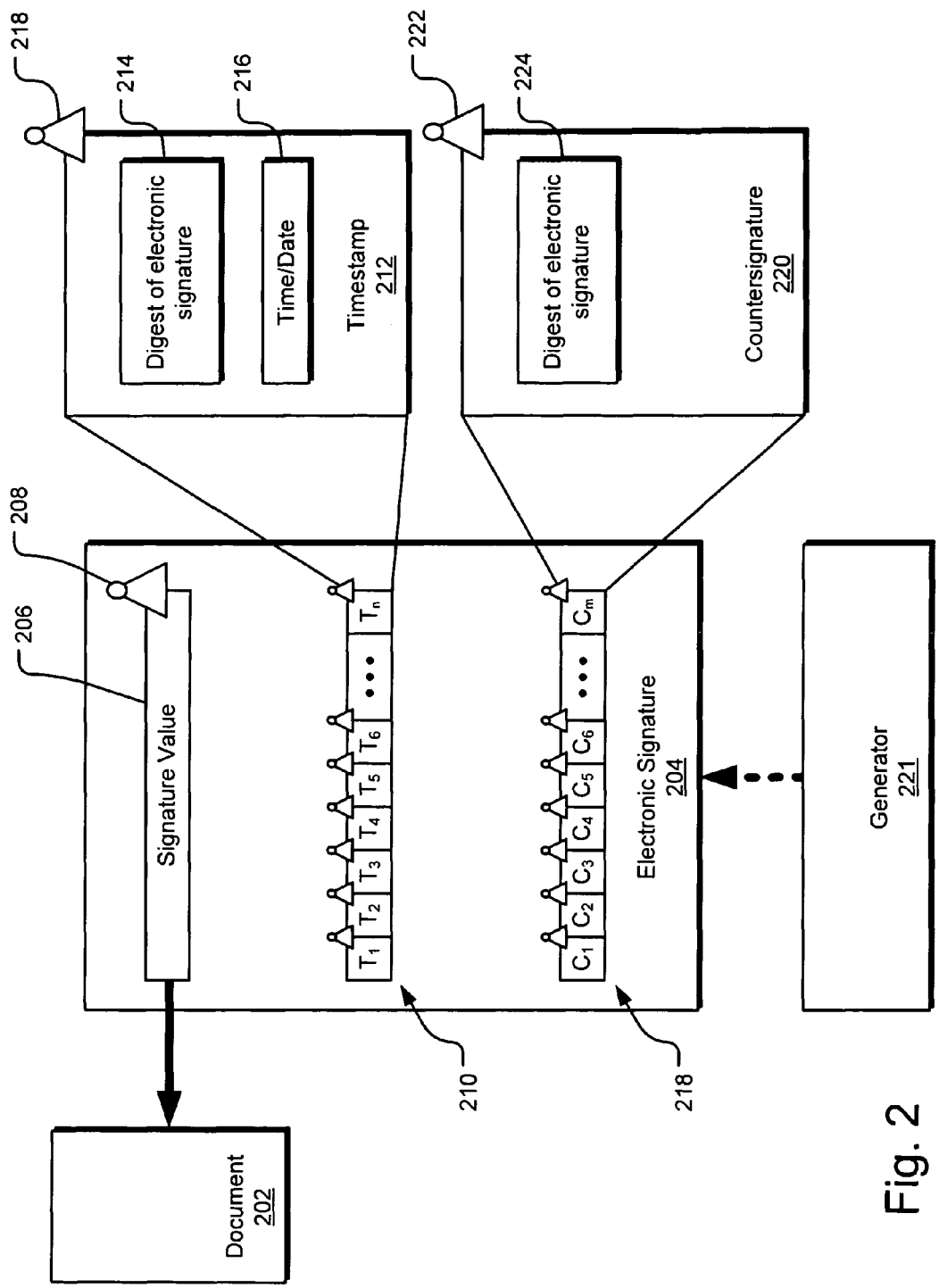
FIG. 2 illustrates input to an example generator of an electronically signed document.

FIG. 2 illustrates input to an example generator of an electronically signed document 202. The generator 221 uses a programming framework to create an electronic signature 204 and associate it with the electronic document 202. Such association can be achieved through a variety of methods, as discussed above, although for the purposes of the description, it will be assumed that the electronic signature is embedded in the electronic document 202. The electronic signature 204 includes without limitation a signature value 206 (with or without a certificate), zero or more timestamps 210 (with or without certificates), and zero or more countersignatures 218 (with or without certificates). In one implementation, the signature value 206 is generated by hashing the digital data that defines the electronic document 202 to create a digest of the electronic signature 204 and then encrypting the digest using the signer's private key.

The generator 221 may also certify the signature value 206 by a certificate 208. The certificate 208 may be a single certificate or a chain of certificates. As discussed previously, one or more certificates associated with the signature value 206 may be invalid at the time of signing (or at the time of verification). The electronic signature 204 may also be associated with one or more timestamps 210, as shown in FIG. 2.

The generator 221 can add timestamps through a timestamp service provided by a timestamp authority, which optionally tests the electronic signature value 206 and the certificates 208 associated therewith. An example timestamp is shown in an exploded view in timestamp 212 to include the digest 214 of the electronic signature value 206 and a time value 216 (e.g., include time and date information). Other parameters can also be combined in the timestamp 212, including without limitation qualifying properties, the hashing algorithm type, etc.

In one implementation, the timestamp authority receives the digest 214 of the signature value 206, combines the digest 214 with a time value 216 (e.g., including time and date information) and potentially other parameters, hashes the combination, encrypts the hashed combination with the timestamp authority's private key (signs it), and sends the signed result back to the original signer for association with the document 202. In an alternative implementation, the timestamp authority receives the electronic signature 204 and verifies the electronic signature value 206 and certificates 208. If these are valid, the timestamp authority hashes the electronic signature value 206 to obtain a new signature digest 214. The timestamp authority then hashes a combination of the new signature digest 214, the time value 216, and potentially other parameters, encrypts the hashed combination with the timestamp authority's private key (signs it), and sends the signed result back to the original signer for association with the document 202. The timestamp 212 may also be certified by one or more certificates 218 and may be associated with its own timestamps and countersignatures.

Each timestamp 210 attests to a time (e.g., a date and time value) at which the electronic signature existed in its specific form. Later, the one or more timestamps 210 can be verified by a verifier 221 to determine the earliest time at which the electronic signature was valid in association with the document 202. For example, company A has an agreement electronically signed by company B and wishes to enforce the agreement in a court of law. Company B repudiates the agreement, claiming that the signature is not valid, pointing out that one of the certificates in the certificate chain of the electronic signature had been revoked. If company A can verify a timestamp with a time prior to the revocation date, company A can adduce reliable evidence that the electronic signature was valid at least at one point in time and is therefore enforceable.

The electronic signature 204 may also be associated with one or more countersignatures 218, as shown in FIG. 2. The generator 221 can add countersignatures through countersigning services provided by a countersignature authority, which can optionally test the electronic signature value 206 and the certificates 208 associated therewith. An example countersignature is shown in an exploded view in countersignature 220 to include the digest 224 of the electronic signature value 206. Other parameters can also be combined in the countersignature 220, including without limitation qualifying properties, the hashing algorithm type, etc.

In one implementation, the countersignature authority receives the digest 224 of the signature value 206, hashes the digest 224, encrypts the hashed digest with the countersignature authority's private key, and sends the encrypted result (i.e., countersignature 220) back to the signer for association with the document 202. In an alternative implementation, the countersignature authority receives the electronic signature 204 and verifies the electronic signature value 206 and certificates 208. If these are valid, the countersignature authority hashes the electronic signature value 206 to obtain a new signature digest 224. The countersignature authority then hashes the new signature digest 224, encrypts the hashed result with the countersignature authority's private key (signs it), and sends the signed result (countersignature 220) back to the original signer for association with the document 202. The countersignature 220 may also be certified by one or more certificates 222 and may be associated with its own timestamps and countersignatures.

Each countersignature 220 represents an approval or notarization of the electronic signature 204 associated with the document 202. For example, if signatures of both parents are required in association with a child's signature on an electronic document, the parents' signatures can be provided as electronic countersignatures 218. In order for the electronic signature 204 to be verified, the verifier 221 validates all of the countersignatures 218.

It should be understood that the electronic signature 204 may not include a set of one or more timestamps or a set of one or more countersignatures. Nevertheless, verification of the electronic signature 204 can be made more robust by inclusion of one or more of these components.

One implementation of the described technology, the generator 221 uses a XadesSignature class, a QualifyingProperties class, and an IxmlTimeStamp class to generate an advanced electronic signature, although other implementations are contemplated. An example XadesSignature class is described below, although variations from the example XadesSignature may be implemented without departing from the described technology. To create an advanced electronic signature, the generator 221 instantiates a XadesSignature object. An XadesSignature object generates and validates XML-based electronic signatures in association with one or more data items. It should be understood, however, that other electronic signature formats may be achieved in alternative implementations.

The example XadesSignature class exposes a selection of public methods and properties:

TABLE 1

XadesSignature Public Methods

| Public Method | Description |
| --- | --- |
| AddDataToSign | Specifies an additional embedded data item to be signed by the XadesSignature object; a reference to the embedded data item is stored by a private property of the XadesSignature object |
| AddReferenceUri | Specifies the URI (Universal Resource Identifier) referencing an additional detached data item to be signed by the XadesSignature object; a reference to the detached data item is stored by a private property of the XadesSignature object |
| ComputeSignature | Initiates the computation of the electronic signature |
| CreateCounterSignature | Creates a new instance of the XadesSignature class to be used as a countersignature associated with the original signature; a reference to the original signature value is stored in the new countersignature object |
| GetXml | Returns the XML data defining the XAdES signature |
| LoadXml | Loads the XML data defining the XAdES signature |
| SignDetached | Signs external (not embedded) data pointed to by the reference URI |
| SignEnveloping | Signs data that is to be embedded in the signature XML |
| TimeStampSignatureValue | Obtains a timestamp for the signature value using a timestamping implementation provided via a callback input parameter, TimeStampDelegate; the timestamp result is added to a collection of signature timestamps maintained in the QualifyingProperties member of the XAdES signature |
| Verify | Verifies the validity of the signature of the XAdES signature, returning a determination of how valid the signature is expected to be |
| AddSignatureTimeStamp | Embeds timestamp in signature |
| AddCounterSignature | Embeds countersignature in signature |

The callback input parameter of the TimeStampSignatureValue method allows the caller to provide a standard or customized method for timestamping the signature, via a method referenced as TimeStampDelegate. Whenever the generator 221 calls the TimeStampSignatureValue method, which calls back the method passed in as TimeStampDelegate and returns the computed timestamp.

TABLE 2

XadesSignature Public Properties

| Public Properties | Description |
| --- | --- |
| Configuration | Configuration options for XadesSignature object |
| EmbeddedSigningCertificate | A signing certificate embedded in the XadesSignature object |
| QualifyingProperties | The QualifyingProperties object associated with the XadesSignature object |
| SignatureId | The XadesSignature object's identifier, stored as a value of the identifier attribute of the Signature element in the XML; also used as a base for all other calculated identifiers in the XadesSignature object |
| SignatureValueId | Identifier of the SignatureValue element |
| SignedXmlObject | A SignedXML object contained within the XadesSignature object (e.g., from a MICROSOFT® .NET System.Security.Cryptography.Xml.SignedXML class) |

An example QualifyingProperties class, as described below, may be employed to support some or all of the qualifying properties specified by the previously incorporated XAdES specification as well as to support additional properties, for example, using XML manipulation. The implementation of a QualifyingProperties object described below employs XML persistence, which allows the object to preserve the elements and attributes of the live XML that the QualifyingProperties object does not natively support.

TABLE 3

QualifyingProperties Public Methods

| Public Methods | Description |
| --- | --- |
| ValidateAgainstSchema | Validate the XML data of current qualifying properties against the XAdES schema |

TABLE 4

QualifyingProperties Public Properties

| Public Properties | Description |
| --- | --- |
| Id | Identifier of QualifyingProperties object |
| QualifyingPropertiesXml | The raw XML defining the qualifying properties |
| SignedProperties | The signed qualifying properties; these properties are added to the signature before it is computed and are then signed together with all the data, and, as such, are included in the signature value; one example is a statement from a signer on which a certificate was used to perform signing |
| Target | The target attribute, referencing the signature to which the qualifying properties apply |
| UnsignedProperties | The unsigned qualifying properties; these properties are not signed together with the data and, as such, are not included in the signature value; time stamps and counter signatures are examples of unsigned properties. |

An example class implementing the IXmlTimeStamp interface, as described below, may be employed to support a timestamp, although other timestamp classes or data structures may be employed. For example, a timestamp can be loaded from the XML-based electronic signature and examined by a verifier using an IXmlTimeStamp interface.

TABLE 5

IXmlTimeStamp Public Methods

| Public Methods | Description |
| --- | --- |
| LoadXml | Load the timestamp from the XML |
| Validate | Validate the timestamp |

TABLE 6

IXmlTimeStamp Public Properties

| Public Properties | Description |
| --- | --- |
| DataHash | The digest of the timestamped data (i.e., the value being timestamped) |
| DataHashAlgorithm | The digest algorithm used on the data |
| TimStampServiceId | A unique identifier of the timestamp entity (e.g., the timestamp authority) |
| TimeStampTime | The date and time value of the timestamp |

Figure 3:
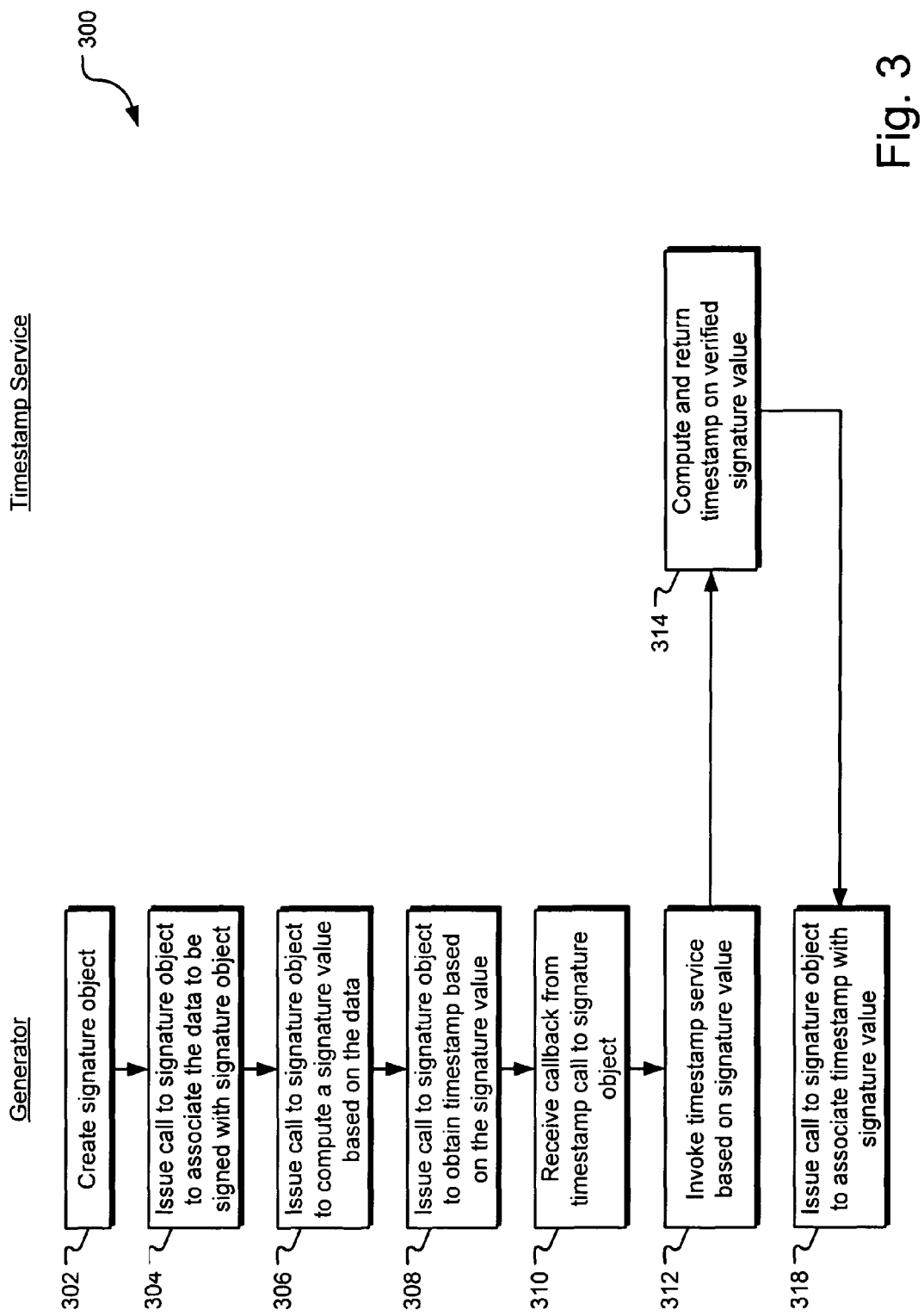
FIG. 3 illustrates example operations for generating a timestamp on a data item.

FIG. 3 illustrates example operations for generating a timestamp on a data item. Most of the illustrated operations are generally performed by an electronic signature generator, although other modules may also perform them. A creation operation 302 creates a signature object, such as an object of the XadesSignature class or some other electronic signature class. In one implementation, an example creation operation 302 initiates a constructor of the XadesSignature class. An association operation 304 issues a call to the signature object that associates the data that is to be signed with the signature object. In one implementation, the creation operation 302 and the association operation 304 are combined into a single call to a creation operation that both creates the object and associates it with the data with the object. A computing operation 306 issues a call to the signature object to compute a signature value based on the data item associated with the signature object. If multiple data items are to be signed, they can be combined prior to being hashed by a hashing algorithm and encrypted to compute the signature value. In one implementation, an example computing operation 306 issues a call to a ComputeSignature method of an XadesSignature object.

A timestamp operation 308 issues a call to the signature object to obtain a timestamp based on the signature value. In one implementations, an example timestamp operation 308 issues a call to a TimeStampSignatureValue method of an XadesSignature object, providing a callback method as an input parameter. A callback operation 310 receives a callback to the callback method (e.g., TimeStampDelegate) provided in the timestamp operation 308. The callback method invokes a timestamping service in a service operation 312.

The timestamp service computes a timestamp (e.g., a date and time value) and returns it to the generator (in computation operation 314). The timestamp can then be embedded into the signature (e.g., an XML signature or other data representation of a signature) to associate the timestamp and the signature value (in association operation 318). Alternatively, the timestamp and the signature can be associatively stored (e.g., in the same directory) to provide the desired association. Other forms of association are also contemplated.

Figure 4:
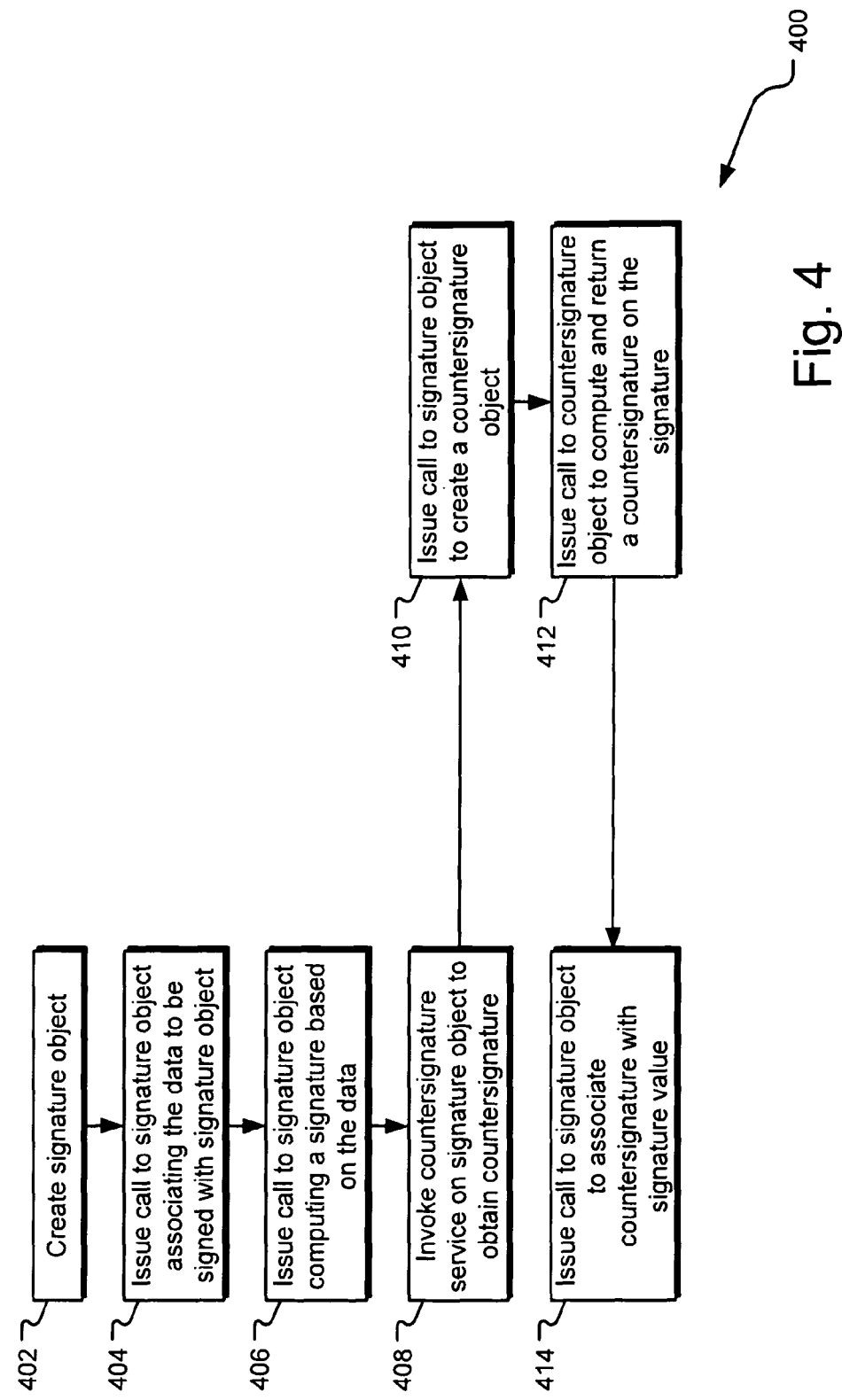
FIG. 4 illustrates example operations for generating a countersignature on a data item.

FIG. 4 illustrates example operations 400 for generating a countersignature on a data item. Most of the illustrated operations are generally performed by an electronic signature generator, although other modules may also perform them. A creation operation 402 creates a signature object, such as an object of the XadesSignature class or some other electronic signature class. In one implementation, an example creation operation 402 initiates a constructor of the XadesSignature class. An association operation 404 issues a call to the signature object that associates the data that is to be signed with the signature object. A computing operation 406 issues a call to the signature object to compute a signature value based on the data item associated with the signature object. If multiple data items are to be signed, they can be combined prior to being hashed by a hashing algorithm and encrypted to compute the signature value. In one implementation, an example computing operation 406 issues a call to a ComputeSignature method of an XadesSignature object.

A service operation 408 invokes a countersignature service to obtain a countersignature, e.g., passing the XadesSignature object to a countersignature authority. The countersignature service issues a call to the signature object to verify the signature value in the signature object, including its certificate (which can include a certificate chain) in a verification operation 410. If the signature value is successfully verified (e.g., the signature value including its certificates are valid), the countersignature service then computes a countersignature value and returns it to the generator (in creation operation 412). The countersignature can then be embedded into the signature (e.g., an XML signature or other data representation of a signature) to associate the countersignature and the signature value (in association operation 414). Alternatively, the countersignature and the signature can be associatively stored (e.g., in the same directory) to provide the desired association.

The example hardware and operating environment of FIG. 5 for implementing the invention includes a general purpose computing device in the form of a gaming console or computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 5. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, an electronic signature generation module, an electronic signature object, a qualifying properties object, a timestamp object, and other modules may be embodied by instructions stored in memory 22 and/or storage devices 29 or 31 and processed by the processing unit 21. An electronic signature, a public key, a private key, a digest, a certificate, a timestamp, a countersignature, and other data may be stored in memory 22 and/or storage devices 29 or 31 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

What is claimed is:

1. A computer-implemented method of electronically signing a data item with an electronic signature, the computer-implemented method comprising:

instantiating, by an electronic signature generator on a computing device, a signature object that exposes a set of application programming interface (API) methods for electronically signing one or more data items with an electronic signature, the set of API methods exposed by the signature object including a timestamping API method for providing a timestamp for the electronic signature;

issuing, by the electronic signature generator, a call to the signature object for associating the signature object with one or more data items to be electronically signed with the electronic signature;

issuing, by the electronic signature generator, a call to the signature object for computing a signature value of the electronic signature, the signature value comprising a digest of the one or more data items to be electronically signed which is encrypted by a private key of an original signer;

certifying, by the electronic signature generator, the signature value of the electronic signature with one or more certificates obtained by invoking certification services of one or more certification entities to attest that a public key for decrypting the encrypted digest belongs to the original signer;

obtaining, by the electronic signature generator, the timestamp for the electronic signature from a trusted third-party authority, the timestamp representing an attestation by the trusted third-party authority that the signature value of the electronic signature and the one or more certificates certifying the electronic signature value existed in their specific forms at a point in time indicated by the timestamp, the electronic signature generator obtaining the timestamp from the trusted third-party authority by:

issuing, to the signature object, a timestamp call that includes a callback method provided by the electronic signature generator which invokes a timestamp service of the trusted third-party authority and is passed as an input parameter to the timestamping API method of the signature object, executing a callback to the callback method received from the signature object in response to the timestamp call to invoke the timestamp service of the trusted third-party authority, and receiving the timestamp for the electronic signature which is returned from the timestamp service of the trusted third-party authority and is based on the signature value of the electronic signature, the timestamp returned from the timestamp service of the trusted third-party authority comprising a hashed combination of a signature digest of the signature value and a time value provided by the trusted third-party authority which is encrypted by a private key of the third-party authority; and issuing, by the electronic signature generator, a call to the signature object for associating the timestamp obtained from the trusted third-party authority with the signature value of the electronic signature.

2. The method of claim 1, further comprising:

issuing, by the electronic signature generator, a call to the signature object for embedding the timestamp obtained from the trusted third-party authority in the electronic signature with the signature value.

3. The method of claim 1, wherein the timestamp obtained from the trusted third-party authority is certified by one or more certificates associated with the timestamp.

4. The method of claim 1, further comprising:

issuing, by the electronic signature generator, a call to the signature object for specifying multiple data items to be electronically signed with the electronic signature; and computing, by the signature object, the signature value of the electronic signature by encrypting a hashed combination of the multiple data items to be electronically signed.

5. The method of claim 4, wherein the signature object exposes an API method for specifying an additional embedded data item to be electronically signed with the electronic signature.

6. The method of claim 4, wherein the signature object exposes an API method for specifying an additional detached data item to be electronically signed with the electronic signature.

7. The method of claim 1, wherein the signature digest of the signature value is computed by executing a hashing algorithm.

8. A computer-readable storage medium that does not consist of a signal, the computer-readable storage medium storing computer-executable instructions implementing the method of claim 1.

9. A computer-implemented method of electronically signing an electronic signature with an electronic countersignature, the method comprising:
  instantiating, by an electronic signature generator on a computing device, a signature object that exposes a set of application programming interface (API) methods for electronically signing one or more data items with electronic signatures, the set of API methods exposed by the signature object including a countersignature API method for electronically signing an original electronic signature with an electronic countersignature;
  invoking, by the electronic signature generator, the countersignature API method exposed by the signature object for creating a countersignature object that is associated with an original electronic signature of the signature object which is to be electronically signed with the electronic counter signature, the countersignature object storing a signature value of the original electronic signature, the signature value comprising a digest of one or more data items electronically signed with the original electronic signature which is encrypted with a private key of an original signer;
  issuing, by the electronic signature generator, a call to the countersignature object for computing a countersignature value based on the signature value of the original electronic signature;
  receiving, by the electronic signature generator, the countersignature value computed by the countersignature object, the countersignature value comprising a signature digest of the signature value of the original electronic signature which is encrypted by a private key of a countersigner; and
  issuing, by the electronic signature generator, a call to the signature object for associating the countersignature value with the signature value of the original electronic signature.

10. The method of claim 9, further comprising:
  issuing, by the electronic signature generator, a call to the signature object for embedding the countersignature value in the original electronic signature with the signature value.

11. The method of claim 9, wherein the signature digest of the signature value of the original electronic signature is computed by executing a hashing algorithm.

12. The method of claim 9 further comprising:
  issuing, by the electronic signature generator, a call to the countersignature object for specifying one or more additional data items to be electronically signed with the electronic countersignature; and
  computing, by the countersignature object, the countersignature value by encrypting a hashed combination of the signature value of the original electronic signature and the one or more additional data items to be electronically signed with the electronic countersignature.

13. The method of claim 12, wherein the countersignature object exposes an API method for specifying an additional embedded data item to be electronically signed with the electronic countersignature.

14. The method of claim 12, wherein the countersignature object exposes an API method for specifying an additional detached data item to be electronically signed with the electronic countersignature.

15. A computer-readable storage medium that does not consist of a signal, the computer-readable storage medium storing computer-executable instructions implementing the method of claim 9.

16. A computer-readable storage medium that does not consist of a signal, the computer-readable storage medium storing computer-executable instructions that, when executed, cause a computing device to perform a computer-implemented method comprising:
  instantiating, by an electronic signature generator on the computing device, a signature object as an instance of a signature class; and
  exposing, by the signature object to the electronic signature generator, a set of application programming interface (API) methods for electronically signing one or more data items with electronic signatures, the set of API methods exposed by the signature object including:
    an API method for associating the signature object with one or more data items to be electronically signed with an original electronic signature;
    an API method for computing a signature value of the original electronic signature, the signature value comprising a digest of the one or more data items to be electronically signed which is encrypted by a private key of an original signer;
    an API method for certifying the signature value of the original electronic signature with one or more certificates obtained by invoking certification services of one or more certification entities to attest that a public key for decrypting the encrypted digest belongs to the original signer;
    a timestamping API method for providing the original electronic signature with a timestamp obtained from a trusted third-party authority, the timestamp representing an attestation by the trusted third-party authority that the signature value of the original electronic signature and the one or more certificates certifying the electronic signature value existed in their specific forms at a point in time indicated by the timestamp, the electronic signature generator obtaining the timestamp from the trusted third-party authority by:
      issuing, to the signature object, a timestamp call that includes a callback method provided by the electronic signature generator which invokes a timestamp service of the trusted third-party authority and is passed as an input parameter to the timestamping API method of the signature object,
      executing a callback to the callback method received from the signature object in response to the timestamp call to invoke the timestamp service of the trusted third-party authority, and receiving the timestamp for the original electronic signature which is returned from the timestamp service of the trusted third-party authority and is based on the signature value of the original electronic signature, the timestamp returned from the timestamp service of the trusted third-party authority comprising a hashed combination of a signature digest of the signature value and a time value provided by the trusted third-party authority which is encrypted by a private key of the third-party authority;

a countersignature API method for electronically signing the original electronic signature with an electronic countersignature, the countersignature API method creating a countersignature object as a separate instance of the signature class that is associated with the original electronic signature of the signature object which is to be electronically signed with the electronic countersignature, the countersignature object storing the signature value of the original electronic signature and exposing an API method to the electronic signature generator for computing a countersignature value based on the signature value of the original electronic signature, the countersignature value comprising a signature digest of the signature value of the original electronic signature which is encrypted by a private key of a countersigner; and one or more API methods for associating the timestamp obtained from the trusted third-party authority and the countersignature value with the signature value of the original electronic signature.

17. The computer-readable storage medium of claim 16, wherein the set of API methods exposed by the signature object includes:

one or more API methods for embedding the timestamp obtained from the trusted third-party and the countersignature value in the original electronic signature with the signature value.

18. The computer-readable storage medium of claim 16, wherein the set of API methods exposed by the signature object includes:

one or more API methods for specifying multiple data items to be electronically signed with the original electronic signature.

19. The computer-readable storage medium of claim 16, wherein the countersignature object exposes one or more API methods for specifying additional data items to be electronically signed with the electronic countersignature.

20. A computing device comprising the computer-readable storage medium of claim 16.

* * * * *